Patented Jan. 21, 1941

2,229,177

UNITED STATES PATENT OFFICE 2,229,177

WATER SHUTOFF IN OIL AND GAS WELLS

Harvey T. Kennedy, Oakmont, and Abraham J. Teplitz, Penn Township, Allegheny County, Pa., assignors to Gulf Research & Development Company, Pittsburgh, Pa., a corporation of Delaware No Drawing. Application May 26, 1939, Serial No. 275,998

6 Claims. (Cl. 166—21)

This invention or discovery relates to water shutoff in oil and gas wells; and it comprises an improvement in methods of shutting off water in oil or gas wells by injection of fluid plugging agents into the well and surrounding water-bearing and oil- or gas-bearing formations, said improvement comprising the steps of injecting into the formations a fluid substance, advantageously one of water-soluble nature, and of such character as to delay or prevent formation of a plug by the plugging agent, and then releasing pressure on the well to cause said fluid substance to be flushed out of the water-bearing formations, while leaving some of said substance in the pores of the oil- or gas-bearing formation, and then injecting said plugging agent, whereby plugging of the water-bearing formation is assured, while plugging of the oil-bearing formation is obviated; all as more fully hereinafter set forth and as claimed.

In oil wells, formations producing water or brine alone are frequently encountered closely adjacent oil or gas producing formations (pay formations). It is a desideratum to seal off such wet formations, to prevent influx of water to the well. One way of sealing wet formations is to inject therein a liquid plugging agent, of such character as to enter the pores and form a sealing plug therein. It is of course undesirable that any plugging of the pay formation take place. Sometimes it is practicable to temporarily close off or isolate the pay formation, prior to such shutoff treatment, as by means of a packer, but sometimes this is quite impossible. Where isolation of the pay formation is not feasible, a plugging agent is selected of such character as to be inert to oil—to give as little plugging as possible in the pay formation, and it is injected indiscriminately into all the formations; i. e. a batch is simply pumped down the well. When it is possible to pack off the pay formation as described, non-selective treatment agents, such as solutions of neutral precipitants injected one after the other (e. g. calcium chloride solution followed by sodium silicate solution) can be employed. This has not been feasible when it is impossible to temporarily close off the pay formation.

In methods wherein the shutoff agent is injected indiscriminately, good results have been obtained, provided the agent is of such character as to give no precipitate on admixture with oil, or the precipitate is soluble in oil, and provided the pay formations are substantially free of water. However, most pay formations contain, along with the oil, appreciable amounts of connate water or brine, in wetting contact with the rock or sand pores and particles. It appears that all, or at least most, pay formations contain some connate water. Oil-bearing sands and rocks are preferentially wet by water or brine, and the connate water persists in the pay formations during flow of oil in the well. A well may be producing oil only, while the oil sand may have its interstices half full of water.

This wide-spread presence of water in the pay formations militates against the success of any water shutoff method, because of deposition of plugging matter in the oil formations. Shutoff treatments with selective agents (inert to oil) injected indiscriminately as described are largely successful, provided the pay formations contain only a little water. They plug the wet sands, and even if they do deposit some sealing material in the pay formations, the net ratio of oil to water produced from the well is increased. However, with high concentrations of connate water in the oil sands, the treatment becomes ineffective and may even kill the well.

There is a desideratum for a process of shutting off water in oil and gas wells containing connate water in the pay formations wherein the plugging agent can be injected indiscriminately into the water producing formations and the pay formations, but the plugging action of the treating agent can be limited to the water producing formation, leaving the pay formations unaffected.

In the Kennedy Patent 2,164,459 a method of handling this problem is set forth, wherein the residual connate water in an oil producing formation is first emulsified and subsequently flushed out of the formation, after which there is injected in the formations adjacent the well a fluent material inert to oil, but adapted to form a plug in the presence of water. Such a method is generally satisfactory, particularly when the pore spaces in the formations to be treated are relatively large. However, it sometimes takes more than one preliminary treatment in order to emulsify and remove all the water present in the pay formation. Furthermore, when the formations are of low permeability it is sometimes difficult to effect the desired emulsification and the removal of the residual connate water. The process further involves the use of plugging agents having a selective action, otherwise the pay formations may be sealed.

In the present invention we have provided a novel process of selectively shutting off water in oil and gas wells containing (or thought to contain) connate water in the pay formations, wherein the formations adjacent the well bore are subjected to one preliminary treatment which effectively prevents the fluid plugging agent subsequently injected into the well from being transformed into an obstructing plug in the pores through which the oil or gas flows to the well bore.

According to our invention, we first inject into the formations adjacent the well bore, under pressure, a preferentially water-soluble fluid substance of such character as to prevent the plugging agent subsequently to be injected from forming an obstructing plug when in contact with a water solution of said substance. The fluid substance penetrates a substantial distance into both the water producing formations which are ultimately to be sealed off and the pay formations which are to be left unobstructed. The pressure on the well is then released to cause the well to flow. This takes place naturally if the formation pressure is sufficiently high. When the formation pressure is low, the well may be pumped to cause the well fluids to flow toward the well from both water-producing and oil-producing formations. The well is permitted to flow sufficiently to remove all of the fluid substance which has found its way into the water-producing formations.

At this stage of the operations, that portion of the fluid substance which originally entered the water-producing formation or formations has been flushed therefrom by the flow. But that portion which has been forced into the oil-producing formations, being preferentially water-soluble, has dissolved in the connate water therein and remains on the surface of the rock particles or sand in the formation. It is not removed by the passage of oil when the pressure is released and the well permitted to flow. The connate water associated with the oil producing formations is thereby converted into a solution which prevents the transformation of the fluid plugging agent into an obstructing plug in the oil-carrying passages.

Subsequently, there is introduced into the well and injected into the formations adjacent thereto a fluid plugging agent adapted to form an obstructing material when not in contact with the inhibiting substance previously injected. This plugging agent penetrates into both the water-producing and oil-producing formations. As the water-producing formations have been flushed free from any inhibiter, the plugging agent ultimately obstructs these passages. However, that portion of the plugging agent which finds its way into the oil producing formations is prevented from obstructing the oil-carrying passages by the action of the inhibitor substance in solution with the connate water in formation. The plugging agent remains fluid. The net effect is that the plugging action of the plugging agent is entirely limited to the water producing formation leaving the pay formations unaffected and productive.

The preliminary treating substance, to insure against obstruction of the oil producing formations, is chosen with a view to the plugging agent subsequently to be employed. In general, the substance is one which is more soluble in water than in oil in order that after injection into the formatiton it will remain in solution in the connate water when the pressure is released and the well permitted to flow. It should also be of such character as to prevent the transformation of the plugging agent into an obstructing material or, at least, to so delay the transformation of the fluid plugging agent that the plugging material in the water-producing formation is transformed into a plug sealing the pores while the plugging agent in the adjacent oil-producing formation is still fluid, whereby on releasing the pressure it is flushed out of the oil-bearing passages before any substantial precipitation or gelation commences. When the substance used in preliminary treatment is of the type which delays, rather than prevents, precipitation of the plugging agent and the plugging agent is water-soluble there may be a slight amount of plugging agent left in solution with the connate water present and after due course such plugging agent may be transformed into an obstructing material. However, it is to be pointed out that when such transformation occurs the oil-bearing passages are not appreciably obstructed, and the oil flow is not diminished, as the transformation takes place only in those passages from which oil is already obstructed by the presence of connate water held in close affinity to the sand grains.

A variety of substances are used as plugging agents in effecting water shut-off and the inhibitor used as a preliminary treating substance in our process varies with the particular substance employed as plugging agent. Some known plugging agents are characterized by their ability to react with the salts in solution in oil field brines to produce plugging precipitate. Other plugging agents are characterized by their ability to be transformed into plugging precipitates or gels when brought into contact with either fresh water or brines. Still other plugging agents are characterized by the fact that they are composed of two mutually-precipitable solutions ordinarily injected into the well in sequence. Other plugging agents are fluid substances adapted to set or harden with the passage of time without coming in contact with or reacting with other substances.

As before stated, the substance employed in preliminary treatment is selected according to the plugging agent we use. For instance, when the plugging agent to be used is a colloidal suspension such as red liquor (iron oxide sol) which is broken by the action of salts in solution such as $MgCl_2$, $NaCl$, and $CaCl_2$, the substance employed in preliminary treatment is usually a strongly alkaline solution, advantageously one which has a substantial buffer action and which does not itself react with the well brine to destroy its inhibitory powers. Since well waters vary widely in constitution and concentration of dissolved salts, different buffers are employed in different specific instances. For instance, where the brines encountered are concentrated and particularly where they contain appreciable quantities of calcium and magnesium salts we use a substance such as sodium lauryl sulfate which is not precipitated by alkaline earth salts. For waters containing only sodium salts, almost any alkaline buffer may be employed.

When the plugging agent to be subsequently employed is one which hydrolyzes or hardens in the presence of water to form an obstructing plug, the substance employed in preliminary treatment is a substance which will prevent hydrolysis or hardening of the plugging agent or at least delay it for an appreciable time. For example, one of the most advantageous selective plugging agents known is methyl silicate which in practice is often injected into the well in combination with an accelerator to decrease the setting time of the mixture on coming into contact with water. Such procedure is described in the copending application of H. T. Kennedy, Serial No. 137,585, filed April 17, 1937. Thus, a mixture of 50 volumes of methyl silicate accelerated with 0.95 per cent by weight hydrochloric acid will set to a hard gel (hydrated silica) when mixed with 15 volumes of salt brine in 1.2 hours at a temperature of 140° F. In using such a plugging agent we employ as a preliminary treating substance one of various substances which delays the setting time of the organic silicates. We have found that ammonium oxalate, aminoacetic acid, phenylglycine, diethanolamine, o-aminophenol and phenylhydrazine will appreciably retard the setting time of the organic silicates when in contact with brine in which the preliminary treating substance is dissolved. Likewise, the organic oxygen-containing solvents (e. g. acetone, lower alcohols, glycols, etc.) which are more soluble in water than in oil are useful as preliminary treating substances either alone or in combination with the organic nitrogen-containing compounds before mentioned. They also delay gelation.

The effect of the preliminary treating substances on the setting time of methyl silicate is shown in the tables below. The setting time is measured as the time required for a mixture of 50 cc. methyl silicate containing 0.95 per cent by weight hydrochloric acid and 15 cc. of salt brine to solidify at a temperature of 140° F. Table I illustrates the effect on the setting time of certain organic nitrogen-containing compounds.

TABLE I

| Preliminary treating substance | Proportion added to the water | Setting time, hours | Ratio: Retarded setting time / Normal setting time |
|---|---|---|---|
| | Percent | | |
| None | | 1.2 | 1.0 |
| Ammonium oxalate | 0.5 | 1.6 | 1.3 |
| | 1.0 | 2.3 | 1.9 |
| Aminoacetic acid | 0.5 | 3.1 | 2.6 |
| | 1.0 | 3.6 | 3.0 |
| Phenylglycine | 5.0 | 2.5 | 2.1 |
| Diethanolamine | 0.25 | 2.0 | 1.7 |

The ratio of the retarded setting time to the normal setting time can be further increased by introducing the nitrogen containing compound in solution in an organic oxygen-containing solvent such as acetone, ethyl alcohol or the like. In such instances both the nitrogen compound and the solvent are effective in retarding the setting time as illustrated by Table II wherein 50 cc. of methyl silicate is added to 15 cc. of treated brine:

TABLE II

| Composition of solution to which methyl silicate is added | Setting time, hours | Ratio: Retarded setting time / Normal setting time |
|---|---|---|
| 1.0% phenylglycine in 60–40 brine-acetone sol | 6.5 | 5.4 |
| 3.0% phenylglycine in 60–40 brine-acetone sol | 9.3 | 7.8 |
| 5.0% phenylglycine in 60–40 brine-acetone sol | 10.3 | 8.6 |
| 1.0% o-aminophenol in 60–40 brine-acetone sol | 5.0 | 4.2 |
| 1.0% phenylhydrazine in 60–40 brine-acetone sol | 9.6 | 8.0 |
| 0.5% phenylhydrazine in 60–40 brine-methyl alcohol | 7.5 | 6.3 |
| 60% brine—40% acetone | 3.5 | 2.9 |
| 60% brine—40% ethyl alcohol | 2.4 | 2.0 |
| 60% brine—40% methyl alcohol | 2.3 | 1.9 |

When the plugging agent used is of such nature as to be transformed by metathesis into a water insoluble precipitate, either by reaction with dissolved constituents of the well brine or by reaction with a second component subsequently introduced, the effectiveness of the plug is dependent on the size of the insoluble crystals formed. We have found that in such cases it is advantageous to use as a preliminary treating agent a protective colloid such as gelatin or various of the water-soluble gums, which although allowing metathesis and precipitation of the reaction product, prevents the growth of crystals to such an extent that obstruction to flow does not result and the fine precipitate when the flushed from the oil-bearing passages when the pressure is released. Such protective colloids are also effective preliminary treating agents in those processes wherein the plugging agent employed in a colloidal suspension such as an iron oxide sol which is transformed into a flocculent precipitate by the action of the salts in the well brines or by the action of electrolytes subsequently injected for the purpose of breaking the sol. The precipitate produced in the presence of a protective colloid is non-flocculent, very fine, and will not plug the oil passages.

The following examples, showing various specific embodiments of the invention, serve to illustrate the manner in which the invention is carried out in practice.

Example I

In treating a flowing well making both oil and water and having the usual casing and tubing, a preliminary treating substance is prepared by dissolving 87.5 pounds of phenylglycine in 5 barrels of commercial acetone and this solution is pumped down the tubing to the bottom of the well, the casing head being open. The casing head is then closed and the preliminary treating substance is forced into the formations adjacent the bottom of the well by loading the tubing with oil (of such specific gravity as to float on the solution) under such pressure as is necessary to inject the charge a substantial distance back from the well bore. At such time as it is' estimated the preliminary treating substance has traveled into the adjacent formations for a considerable distance the injection is stopped, but the pressure is maintained to prevent the well from flowing for, say, one-half hour. The pressure is then released and the well produced through the tubing for sufficient time to insure that the preliminary treating substance has been entirely flushed out from any water-producing formations. The casing head is again opened and there is then pumped down the tubing to the bottom of the well under a head of oil, two barrels of a fluid plugging agent consisting of methyl silicate having incorporated therewith 0.95 per cent by weight hydrochloric acid to adjust the setting time of the plugging agent to about 1.2 hours under normal conditions. The casing head is again closed and the silicate plugging agent is injected into the formation for a substantial distance away from the well bore by loading the tubing with oil under pressure and the well is again closed in for about 8 hours so that the plugging agent will set in the water producing formations. At the end of this time any plugging agent in the pay formations, being in contact with the preliminary treating substances, remains fluid. The pressure is gradually released and the well is permitted to flow slowly to flush the unset plugging agent from the pay formations while causing a minimum disturbance of the newly set gel in the water formations. It is found that the amount of water subsequently made is practically negligible, while the rate of oil production remains substantially undiminished.

*Example II*

In a pumping well, the well is pumped to lower the fluid level as far as possible. According to the invention, we introduce through the casing a preliminary treating substance consisting of 12 gallons of phenylhydrazine in solution in 5 barrels methyl alcohol. Then the casing is loaded with a low density oil, while the pump is idle, to impose pressure on the solution and drive it back into the adjacent rock formations. Ordinarily, in wells requiring pumping, the hydrostatic head of the oil in the casing is sufficient to inject the chemical a substantial distance back into the formations, but where this is not effective additional pressure may be applied at the well head. At such time as the preliminary treating substance has traveled a substantial distance into the adjacent formations, the pressure on the casing head is relieved and the well is pumped through the tubing to flush out the treating agent from the water formations.

There is then injected into the formations, under a head of oil, about three barrels of a fluid plugging agent made up by mixing equal volumes of ethyl silicate and water, adjusted by the addition of acid to impart a suitable setting time to the mixture. For instance, the setting time may be adjusted to approximately three hours, or slightly over, by adding 0.2% of hydrochloric acid to the mixture. Usually the acid is added to the water prior to mixing, as the operation is thereby facilitated and the mixture made more uniform. This fluid plugging agent is injected into the formations adjacent the well bore, according to the same mechanical procedure employed in injecting the preliminary treating substance. The well is again closed in for about 10 hours, after which the pressure is relieved and the well again produced slowly by pumping.

*Example III*

This example illustrates one specific embodiment of the invention wherein the plugging is accomplished by injecting in sequence two solutions normally adapted to give a plugging precipitate by metathesis.

In treating a producing well, the conditions being those encountered in Example I, a batch of 5 barrels of an aqueous, fluid colloidal solution of gum arabic (5%) or gelatin (1%) is pumped down the tubing to the bottom of the well, is forced into the formation adjacent thereto and the pressure is maintained for a time to afford an opportunity for the sol to be taken up by the connate water. The pressure is then released and the well produced sufficiently to insure adequate flushing out of the preliminary treating substance from the water producing formation. Any excess of water and colloidal sol that is not held in affinity by the connate water originally present will be flushed out of the pay formation, but enough protective colloid remains in colloidal suspension in the connate water to produce the desired subsequent effect. Subsequently we inject, in sequence, a pair of mutually precipitable solutions such as an aqueous solution of sodium carbonate or bicarbonate (say, a 5% sodium carbonate solution) and an aqueous solution of calcium chloride (5%). After the injection of the second reagent the well is closed in for an hour to permit metathesis and precipitation after which the pressure is released and the well is permitted to flow. The gelatin or gum arabic which has been retained in colloidal solution by the connate water in the pay formation prevents coalescence of the precipitate particles and when the pressure is released the fine precipitate produced by the plugging agent is flushed out of the pay formation. However, in the water producing formations there is nothing to restrain the growth of the particles precipitated and consequently they reach such a size as to plug or obstruct the pores.

*Example IV*

In a pumping well, the well is pumped to lower the fluid level as far as possible. We then introduce into the casing a preliminary treating substance consisting of 2 gallons of acetone-phenylhydrazone dissolved in 200 gallons of acetone. Then the casing is loaded with a low-density oil which floats on the acetone to impose pressure on the solution and drive it back into the adjacent rock formations. Additional pressure may be applied at the well head if necessary. At such time as the preliminary treating substance has traveled a substantial distance into the adjacent formations, the pressure on the casing head is relieved and the well is pumped through the tubing until the well again begins to produce water. There is then prepared a fluid plugging agent by mixing 65 gallons of an aqueous solution of hydrochloric acid of specific gravity 1.062 with 133 gallons of sodium silicate solution (prepared from 40.5° Bé. sodium silicate—3.22 SiO$_2$:1 Na$_2$O) of specific gravity 1.115. In mixing these constituents the silicate should be added to the acid with constant stirring. Prepared in this way, the mixture produces a clear, fluid sol which has a setting time of about 1½ hours at normal well temperatures and about 3½ hours when mixed with 10 per cent of the preliminary treating substance. This sol, immediately after preparations, is injected into the formations with the aid of an oil load, and the well is shut in for about 2½ hours to allow the plugging agent to set in the water formation. The pump is then operated very slowly to remove unset chemical from the oil formation while disturbing the set chemical in the water formation as little as possible.

Prior to our invention, in order to prevent the obstruction of pay formations it was necessary to pack off the water-producing formations from the pay formation before injecting non-selective treating reagents. By the provisions of the present invention this cumbersome procedure has been overcome and a method provided whereby non-selective plugging agents can be employed to give a selective shutoff without packing off the producing strata which, as before stated, is a difficult procedure.

The foregoing examples are cited by way of illustration only. The method described is susceptible of numerous variations without departing from the spirit and scope of the invention as defined in the appended claims.

In the specification and claims the term plugging agent is employed to indicate any fluid substance which undergoes transformation to form an obstructing plug in the formations. Where more than one fluid substance is injected to produce a plug, i. e. where the plugging agent is divided into two components, the term plugging agent is used collectively. The term preliminary treating substance is employed to indicate those fluid substances which delay or prevent the transformation of a plugging agent when in contact therewith.

What we claim is:

1. A process of shutting off aqueous liquids in oil and gas wells which comprises injecting under pressure into both pay formations and aqueous liquid producing formations adjacent a well bore a fluid preliminary treating substance more soluble in water than in oil and comprising an inhibitor adapted to at least delay transformation of a subsequently injected plugging agent into an obstructing plug when in contact therewith, releasing the pressure and causing the well to flow sufficiently to remove said preliminary treating substance from any aqueous liquid producing formation, subsequently injecting into both said formations under pressure a fluid plugging agent transformation of which into an obstructing plug is delayed by contact with said inhibitor, maintaining pressure on the well to prevent flow for a time sufficient to enable transformation of uninhibited plugging agent into an obstructing plug, but insufficient to permit transformation of any plugging agent in contact with said inhibitor and thereafter releasing the pressure and causing the well to flow sufficiently to remove untransformed plugging agent from said formations.

2. A process according to claim 1 wherein said preliminary treating substance is an amino compound in solution in an organic oxygen-containing solvent and said plugging agent is a fluid silicate sol.

3. A process of selectively shutting off aqueous liquids in oil and gas wells which comprises indiscriminately injecting into both pay formations and aqueous liquid producing formations under pressure a preliminary treating substance comprising an acetone solution of an amino compound substantially more soluble in water than in oil, releasing the pressure and causing the well to flow sufficiently to remove said preliminary treating substance from any aqueous liquid producing formation, subsequently indiscriminately injecting into said formations under pressure a fluid plugging agent comprising an organic silicate adapted to form an obstructing plug on contact with the aqueous liquids in the formation and adjusted with acid to normally form a sealing plug comprising hydrated silica in contact with an excess of the aqueous liquid at a substantially definite time after coming in contact therewith, maintaining the pressure on said plugging agent for a time approximately corresponding to the normal setting time and thereafter releasing the pressure and causing the well to flow sufficiently to remove unset treating agent from the formations.

4. A process according to claim 1 wherein said preliminary treating substance is an acetone solution of phenyl glycine and said plugging agent is an alkyl ester of orthosilicic acid.

5. A process according to claim 1 wherein said preliminary treating substance is an alkaline buffer solution and said plugging agent is a colloidal suspension of such character as to be normally broken by the action of well brines with production of an insoluble obstructing plug.

6. A process according to claim 1 wherein said preliminary treating substance is a protective colloid and said plugging agent comprises a substance adapted to be transformed by metathesis into a crystalline water insoluble precipitate.

HARVEY T. KENNEDY.
ABRAHAM J. TEPLITZ.